United States Patent Office 3,519,665
Patented July 7, 1970

3,519,665
DIRECT SYNTHESIS OF DIALKYLTIN DICHLORIDE
Kenneth R. Molt, Cincinnati, and Ingenuin Hechenbleikner, Kenwood, Ohio, assignors to Carlisle Chemical Works, Inc., Reading, Ohio, a corporation of Ohio
No Drawing. Filed Jan. 25, 1968, Ser. No. 700,369
Int. Cl. C07f 7/22
U.S. Cl. 260—429.7                                13 Claims

ABSTRACT OF THE DISCLOSURE

Dialkyltin dichlorides are prepared by reacting tin with a 1 to 4 carbon atom alkyl chloride in the presence of phosphonium iodide, separating the dialkyl-tin dichloride from the other tin reaction products and recycling the catalyst and other reaction products to a reaction chamber together with more alkyl chloride to form more dialkyltin dichloride. Excellent yields with virtually no waste of tin are obtained by such recycling. The dialkyltin dichloride is preferably separated from closely boiling byproducts by crystallization and the byproducts returned to the reaction chamber. Less preferably there can be employed quaternary ammonium iodides in place of the phosphonium iodide.

---

The present invention relates to the preparation of dialkyltin dichlorides.

The preparation of dialkyltin dichlorides is disclosed in Nitto French Pat. 1,393,779 and Albright Netherlands patent application 6512145. Numerous catalysts including onium compounds are disclosed in the Nitto patent. Catalysts are expensive and byproducts are formed in substantial amounts. The Albright patent is similar but limited to the use of onium catalysts. As noted in Albright organotin trihalides are produced simultaneously with the desired diorganotin dihalides. The Albright patent proposes the reuse of the catalyst residue. In Example 7 Albright takes the catalyst residue after removing the dioctyltin dibromide and octyltin tribromide and reuses it with metallic tin and octyl bromide to get a 70% yield of mixed octyltin bromides based on the tin employed. In Example 10 Albright similarly reuses catalyst residue to obtain dibutyltin dichloride in an amount of 75% based on the tin employed together with 10% of butyltin trichloride.

It is an object of the present invention to develop an improved procedure for preparing dialkyltin dichlorides.

A further object is to devise such a procedure which does not involve loss of expensive catalyst.

A further object is to develop such a process which can be carried out at atmospheric pressure in the absence of added solvents.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

It has now been found that these objects can be attained by reacting tin with an alkyl chloride of the formula $R_1Cl$ in the presence of a phosphonium iodide catalyst, separating the dialkyltin dichloride formed from the other tin containing reaction products and catalyst and recycling the said other tin containing reaction products and catalyst to a reaction zone, adding further amounts of tin and alkyl chloride and repeating the reaction to recover further amounts of dialkyltin dichloride of the formula $(R_1)_2SnCl_2$. In the above formulae $R_1$ is alkyl of 1 to 4 carbon atoms.

In place of the phosphonium iodide less preferably there can be employed quaternary ammonium iodides providing there is a total of at least six, and preferably at least eight carbon atoms total in the quaternary ammonium iodide.

By this process yields of dialkyltin dichloride on the first and subsequent recycling are substantially quantitative based on the amount of tin employed. While various other tin compounds, e.g. mono and trialkyl tin chlorides are formed in the initial reaction none of these other products (e.g. mono and trialkyltin chlorides) are formed in the first and subsequent reactions employing recycled catalyst and reaction products.

The reaction goes best employing methyl chloride but there can be used ethyl chloride, propyl chloride, butyl chloride, isopropyl chloride, isobutyl chloride and sec. butyl chloride.

The products of the invention include dimethyltin dichloride, diethyltin dichloride, dipropyltin dichloride, disec butyltin dichloride and methyl ethyl tin dichloride.

As the catalyst there is employed a phosphonium iodide. It is critical that the anion be an iodide in the phosphonium compound since when employing bromides or chlorides the reaction goes much more slowly. Examples of suitable phosphonium compounds are tetramethyl phosphonium iodide, tetraethyl phosphonium iodide, tetrapropyl phosphonium iodide, tetrabutyl phosphonium iodide, tetraisopropyl phosphonium iodide, tetraoctyl phosphonium iodide, tetradodecyl phosphonium iodide, tetraoctadecyl phosphonium iodide, tetraphenyl phosphonium iodide, tetrabenzyl phosphonium iodide, octyl triphenyl phosphonium iodide, methyl triphenyl phosphonium iodide, dodecyl triphenyl phosphonium iodide, phenyl ethyl tetramethylene phosphonium iodide, tetra p. tolyl phosphonium iodide.

Less preferably there can be used trialkyl or triaryl phosphonium diiodides such as tributyl phosphonium diiodide and triphenyl phosphonium diiodide since there is some reduction in reaction of the tin whereas there is 100% reaction of the tin when employing tetraalkyl or tetraaryl phosphonium iodides as shown in experiments with phosphonium iodides ranging from tetramethyl phosphonium iodide to tetraoctyl phosphonium iodide, tetraphenyl phosphonium iodide and dodecyl triphenyl phosphonium iodide.

As quaternary ammonium iodides there can be employed as catalysts dimethyl diethyl ammonium iodide, tetraethyl ammonium iodide, tetrapropyl ammonium iodide, tetrabutyl ammonium iodide, tetraisopropyl ammonium iodide, tetraoctyl ammonium iodide, tetradodecyl ammonium iodide, tetraoctadecyl ammoniu iodide, tetraphenyl ammonium iodide, tetrabenzyl ammonium iodide, octyl triphenyl ammonium iodide, methyl triphenyl ammonium iodide, dodecyl triphenyl ammonium iodide, phenyl ethyl tetramethylene ammonium iodide, phenyl ethyl pentamethylene ammonium iodide, tetra p-tolyl ammonium iodide.

The phosphonium iodide or quaternary ammonium iodide need not be preformed but can be formed in situ by adding the appropriate reagents. Thus, the phosphonium iodides can be formed in situ for example by adding an alkyl iodide to a secondary or tertiary phosphine. Thus if tributyl phosphine and methyl iodide are added to the reaction mixture there is formed methyl tributyl phosphonium iodide. Similarly from tributyl phosphine and ethyl iodide there is formed ethyl tributyl phosphonium iodide, from trioctyl phosphine and octyl iodide there is formed tetraoctyl phosphonium iodide.

The reaction is carried out by heating, e.g. at 50–250° C.

Since the compounds of the formula $R_1SnCl_3$ and $(R_1)_3SnCl$ formed as byproducts in the initial reaction are recycled they do not complicate the separation of the desired $(R_1)_2SnCl_2$. There is no indication that the mono and/or trialkyltin chlorides increase during repeated recycling. Hence after the initial reaction (i.e. the reaction prior to the first recycling) the tin is converted almost quantitatively to the desired dialkyltin dichloride.

It appears that there are formed alkyltin iodides and chloro iodides, e.g. dialkyltin diiodide and dialkyltin chloro iodide, in the initial reaction. These are separated from the desired dialkyltin dichloride by crystallization of the desired dichloride from any convenient solvent and the diiodide and chloro iodide returned to the catalyst system for subsequent, i.e., recycling, runs. No buildup of the diiodides or chloro iodides have been observed in the recycling and the recycling can be continued indefinitely, e.g. 4, 20, 100 or 1,000 times.

Also no catalyst is lost in the recycling and the same catalyst can be used virtually forever.

The desired dialkyltin dichloride can be separated from the other components in any convenient manner, e.g. by distillation. It is then purified, e.g. by fractional distillation, or more preferably by crystallization from any organic solvent therefor. Illustrative of such solvents are hydrocarbons such as pentane, hexane, isooctane, octane, decane, tetrahydronaphthalene, benzene, toluene, gasoline and petroleum ether, as well as other solvents such as ether, alcohol, methyl alcohol, isopropyl alcohol, etc.

The solvents are preferably volatile and are thus readily removed before recycling of the byproducts. If desired, however, the solvent can be recycled with the byproducts. This is normally not preferred since one of the advantages of the present process is that there is no need to employ a solvent in forming the dialkyltin dichloride.

In order to react all the tin there should be used at least two moles of alkyl chloride per atom of tin. An excess of alkyl chloride can be used, e.g. there can be as much as 8 moles or more of alkyl chloride per atom of tin although usually only a slight excess of alkylchloride is employed.

The phosphonium iodide is normally used in an amount of 0.1 to 0.6 mole per atom of tin but this proportion also is not critical and can be varied, e.g. as shown in the Nitto patent.

The reaction is conveniently carried out at atmospheric pressure although super or sub atmospheric pressure can be used.

As previously stated the reaction is preferably carried out with methyl chloride to prepare dimethyltin dichloride since the reaction goes somewhat slower when employing higher alkyl chlorides, e.g. butyl chloride to form dibutyltin dichloride.

Unless otherwise indicated all parts and percentages are by weight.

EXAMPLE 1

(a)

One mole of mossy tin metal and 0.2 mole of tetrabutyl phosphonium iodide were heated to 150–160° C. and gassed with methyl chloride for 10 hours. Substantially all of the tin was reacted. The reaction mixture was distilled up to a pot temperature of 220° C. at 10 mm. Hg to give 134 grams of distillation residue. The distillate (146 grams) was dissolved in 100 grams of boiling isooctane and then cooled to 20° C. White crystals of dimethyltin dichloride were removed by filtration, yield 132 grams (0.60 mole), M.P. 106–108° C., Cl 32.2%.

Isooctane was distilled from the filtrate to give 14 grams of mixed methyltin chlorides-iodides. The distillation residue (134 grams) referred to previously was found to contain 0.26 mole of dimethyltin dichloride complexed with the phosphonium iodide catalyst.

(b)

One mole of mossy tin was added to the combined filtrate residue (14 grams) and distillation residue (134 grams) from (a) and the mixture was gassed with methyl chloride for 10 hours at 150–160° C. Substantially all of the tin metal was consumed. Distillation of the reaction mixture up to a pot temperature of 220° C. at 10 mm. Hg gave 220 grams of distillate. Crystallization from 150 grams of isooctane in the manner set forth in (a) gave 205 grams (0.934 mole) of dimethyltin dichloride, M.P. 106–108° C.; Cl 32.3%.

(c)

The procedure set forth in (b) was repeated using the combined filtrate residue and distillation residue from (b) together with one mole of mossy tin and gassing with methyl chloride at 150–160° C. to give a yield of purified dimethyltin dichloride of 199 grams (0.905 mole), M.P. 106–108° C.

(d)

The procedure set forth in (c) was repeated using the combined filtrate residue and distillation residue from (c) together with one mole of mossy tin and gassing with methyl chloride at 150–160° C. to give a yield of purified dimethyltin dichloride of 196 grams (0.893 mole), M.P. 106–108° C.

(e)

The procedure set forth in (d) was repeated using the combined filtrate residue and distillation residue from (d) together with one mole of mossy tin and gassing with methyl chloride at 150–160° C. to give a yield of purified dimethyltin dichloride of 202 grams (0.918 mole), M.P. 106–108° C. The residue from the distillation was 161 grams.

It can be seen from the above that the process can be repeated virtually indefinitely without loss of catalyst potency or formation of further byproducts.

EXAMPLE 2

(a)

One mole of mossy tin and 0.2 mole of tetrabutyl phosphonium iodide were heated to 160° C. and gassed with ethyl chloride for 11 hours. The reaction mixture was distilled to give 63 grams of distillate. The distillate was dissolved in 50 grams of hexane and cooled to 0° C. Filtration gave 31 grams (0.125 mole) of pure diethyltin dichloride, M.P. 80–82° C. The solvent was removed from the filtrate to yield 31 grams of mixed diethyltin diiodide and diethyltin chloro-iodide (46.0% tin or 0.12 mole). The distillation residue contained 62 grams of unreacted tin metal and 115 grams of organic material which analyzed 20.8% tin (0.202 mole based on the tin). A total of 0.478 mole of tin were consumed.

(b)

The distillation residue and filtrate residue from (a) were combined and gassed with ethyl chloride for 11 hours at 160° C. Substantially all of the tin metal was consumed. Distillation of the reaction mixture followed by addition of hexane and crystallization as in (a) gave excelent yields of pure diethyltin dichloride based on the 0.522 mole of available tin.

EXAMPLE 3

(a)

0.5 mole of mossy tin, 1.5 mole of n-butyl chloride and 0.08 mole of tetrabutyl phosphonium iodide were sealed in an autoclave and heated for 6 hours at 150° C., while agitating the mixture. The reaction mixture was then transferred to a distillation flask and subjected to fractional distillation. The first fraction consisted mostly of butene and amounted to 6 grams. The second fraction was 0.55 mole of n-butyl chloride. The third fraction of 98 grams boiled at 100 to 130° C. at 0.5 mm. Hg pressure and was a mixture of dibutyltin dichloride, dibutyltin chloro-iodide and dibutyltin diiodide. The dibutyltin dichloride was isolated in pure form by dissolving the distillate in 50 grams of warm hexane and cooling to 0° C. The dibutyltin dichloride was separated by filtration to give a yield of 0.19 mole, M.P. 40–42° C., leaving the butyltin chloro-iodide and iodides in the filtrate. After removal of the hexane the filtrate residue thus obtained was used in the next batch (identified below as (b)). The distillation residue (after removal of the 98 gram third fraction) contained 0.12 mole of unreacted tin metal and 47 grams of organic material that analyzed 25.0% tin. The organic portion was found to be a complex of $Bu_4PI$ with $Bu_2SnX_2$ where X is Cl or I.

(b)

The unreacted tin (0.12 mole) from (a) was combined with the distillation residue and filtrate residue from (a) and charged to the autoclave with the 0.55 mole of recovered n-butyl chloride, 1.0 mole of fresh n-butyl chloride and 0.5 mole of fresh mossy tin. The contents of the autoclave were agitated and heated for 6 hours at 150° C. The reaction mixture was then separated by the same method employed in (a). There were obtained 0.20 mole of unreacted tin, 0.38 mole of pure dibutyltin dichloride, 0.12 mole of mixed dibutyltin diiodide and dibutyltin chloro-iodide and 0.09 mole of $Bu_2SnX_2$ complexed with $Bu_4PI$ (where X is Cl or I).

The results of reactions (a) and (b) are set forth in the table below.

|  | (a) | (b) | Total |
|---|---|---|---|
| Tin used (moles) | 0.38 | 0.42 | 0.80 |
| Tin isolated (moles): |  |  |  |
| As pure $Bu_2SnCl_2$ | 0.19 | 0.38 | 0.57 |
| As $Bu SnI_2$ and $Bu_2 SnClI$ |  | 0.12 | 0.12 |
| As $Bu_2 SnX_2 Bu_4 PI$ |  | 0.09 | 0.09 |
| Total tin isolated |  |  | 0.78 |

The reaction rate for (b) was as fast as for (a) even though no make up catalyst was employed. The catalyst also was not degraded in the reaction but was effectively recycled.

EXAMPLE 4

(a)

0.10 mole of mossy tin, 0.02 mole of catalyst as set forth in Table 1 and 0.04 mole of dimethyltin dichloride were charged into a 250 ml. flask equipped with a stirrer, gas inlet and water cooled condenser. The flask was heated in a 160° C. oil bath, while methyl chloride gas was admitted at a rate about equal to its rate of reaction. After eight hours the contents were cooled and filtered to remove the unreacted tin, if present. The reaction mixture was then distilled up to a pot temperature of 220° C. at 10 mm. Hg to recover dimethyltin dichloride as distillate. The distillate was dissolved in boiling isooctane and then cooled to 20° C. The dimethyltin dichloride crystallized and was removed by filtration. It was found that the amount of dimethyltin dichloride formed in each case was almost quantitative based on the percent tin consumed. The percent of tin consumed with a variety of catalysts is set forth in Table 1.

TABLE 1

| No. | Catalyst | Percent tin consumed |
|---|---|---|
| 1 | Iodine | 9.3 |
| 2 | Ammonium iodide | 7.6 |
| 3 | Tetramethyl ammonium iodide | 6.8 |
| 4 | Tetraethyl ammonium iodide | 100.0 |
| 5 | Tetrabutyl ammonium iodide | 100.0 |
| 6 | Tetraoctyl ammonium iodide | 100.0 |
| 7 | Methyl triphenyl ammonium iodide | 100.0 |
| 8 | Triethyl ammonium dioiodide | 52.0 |
| 9 | Tributyl ammonium dioiodide | 57.0 |
| 10 | Tetramethyl phosphonium iodide | 100.0 |
| 11 | Tetrabutyl phosphonium iodide | 100.0 |
| 12 | Tetraoctyl phosphonium iodide | 100.0 |
| 13 | Dodecyl triphenyl phosphonium iodide | 100.0 |
| 14 | Tetraphenyl phosphonium iodide | 100.0 |
| 15 | Tributyl phosphonium diiodide | 64.0 |
| 16 | Triphenyl phosphonium diiodide | 63.0 |

(b)

Sufficient mossy tin was added to each of the combined filtrate residue and distillation residue mixtures from (a) to bring the tin up to 0.10 mole and the sixteen mixtures thus formed were separately gassed with methyl chloride for eight hours at a rate about equal to its rate of reaction. It was found that the amount of tin consumed and the amount of dimethyltin dichloride formed in each case was substantially the same as in Example 4(a), i.e., there was no change in catalyst activity as a result of recycling.

It will be observed that iodine, ammonium iodide and tetramethyl ammonium iodide gave very poor yields of dimethyltin dichloride as compared with the catalysts of the invention.

Because of the ability to recycle catalyst in the present invention there is no depletion of the expensive iodide in the catalyst mixture and this is an important feature of the invention.

What is claimed is:

1. In a process of preparing a compound having the formula $(R_1)_2SnCl_2$ where $R_1$ is an alkyl group of 1 to 4 carbon atoms by reacting tin with an alkyl chloride of the formula $R_1Cl$ in the presence of a catalyst which is either (1) an organic ammonium iodide having a total of at least six carbon atoms in the organic groups or (2) a phosphonium iodide, the improvement comprising separating the $(R_1)_2SnCl_2$ from the initial reaction mixture and forming new $(R_1)_2SnCl_2$ by reacting $R_1Cl$ and tin in the presence of all of the organotin compounds and ammonium iodide or phosphonium iodide compounds remaining after the separation of the $(R_1)_2SnCl_2$ from the initial reaction mixture.

2. A process according to claim 1 wherein the recycling is repeated at least four times.

3. A process according to claim 1 wherein the catalyst is a phosphonium iodide.

4. A process according to claim 3 wherein $R_1$ is methyl.

5. A process according to claim 4 wherein the phosphonium iodide has the formula $(R_2)_4PI$ and wherein the $R_2$ groups are alkyl or carbocyclic aryl.

6. A process according to claim 3 wherein the phosphonium iodide has the formula $(R_2)_4PI$ and wherein the $R_2$ groups are alkyl or carbocyclic aryl.

7. A process according to claim 6 wherein the $(R_1)_2SnCl_2$ is separated from the organotin compounds and phosphonium iodide compounds by distillation followed by dissolving the impure $(R_1)_2SnCl_2$ in a solvent and recovering pure $(R_1)_2SnCl_2$ by crystallization thereof from said solvent.

8. A process according to claim 3 wherein the $(R_1)_2SnCl_2$ is recovered admixed with $(R_1)_2SnI_2$ and $(R_1)_2SnClI$ and is separated therefrom by dissolving the impure $(R_1)_2SnCl_2$ in a solvent and recovering pure $(R_1)_2SnCl_2$ by crystallization thereof from said solvent.

9. A process according to claim 1 wherein at least a portion of the tin employed in forming the new $(R_1)_2SnCl_2$ is unreacted tin from the initial reaction.

10. A process according to claim 1 wherein the catalyst is an organic ammonium iodide having a total of at least six carbon atoms in the organo group.

11. A process according to claim 10 wherein $R_1$ is methyl.

12. A process according to claim 11 wherein the ammonium iodide has the formula $(R_3)_4NI$ and wherein the $R_3$ groups are alkyl or carbocyclic aryl and there are at least a total of eight carbon atoms in the $R_3$ groups.

13. A process according to claim 10 wherein the ammonium iodide has the formula $(R_3)_4NI$ and wherein the $R_3$ groups are alkyl or carbocyclic aryl and wherein not over two $R_3$ groups are methyl.

(References on following page)

References Cited

UNITED STATES PATENTS

| | | | |
|---|---|---|---|
| 2,862,944 | 12/1958 | Gloskey | 260—429.7 |
| 3,080,408 | 3/1963 | Andreas et al. | 260—429.7 |
| 3,085,102 | 4/1963 | Yatagai et al. | 260—429.7 |
| 3,340,283 | 9/1967 | Closkey | 260—429.7 |
| 3,387,012 | 6/1968 | Jasching et al. | 260—429.7 |
| 3,387,011 | 6/1968 | Coates et al. | 260—429.7 |
| 3,404,167 | 10/1968 | Gray et al. | 260—429.7 |
| 3,415,857 | 12/1968 | Hoye | 260—429.7 |

FOREIGN PATENTS

| | | |
|---|---|---|
| 1,053,996 | 1/1967 | Great Britain. |

TOBIAS E. LEVOW, Primary Examiner

W. F. W. BELLAMY, Assistant Examiner